Figure 1:
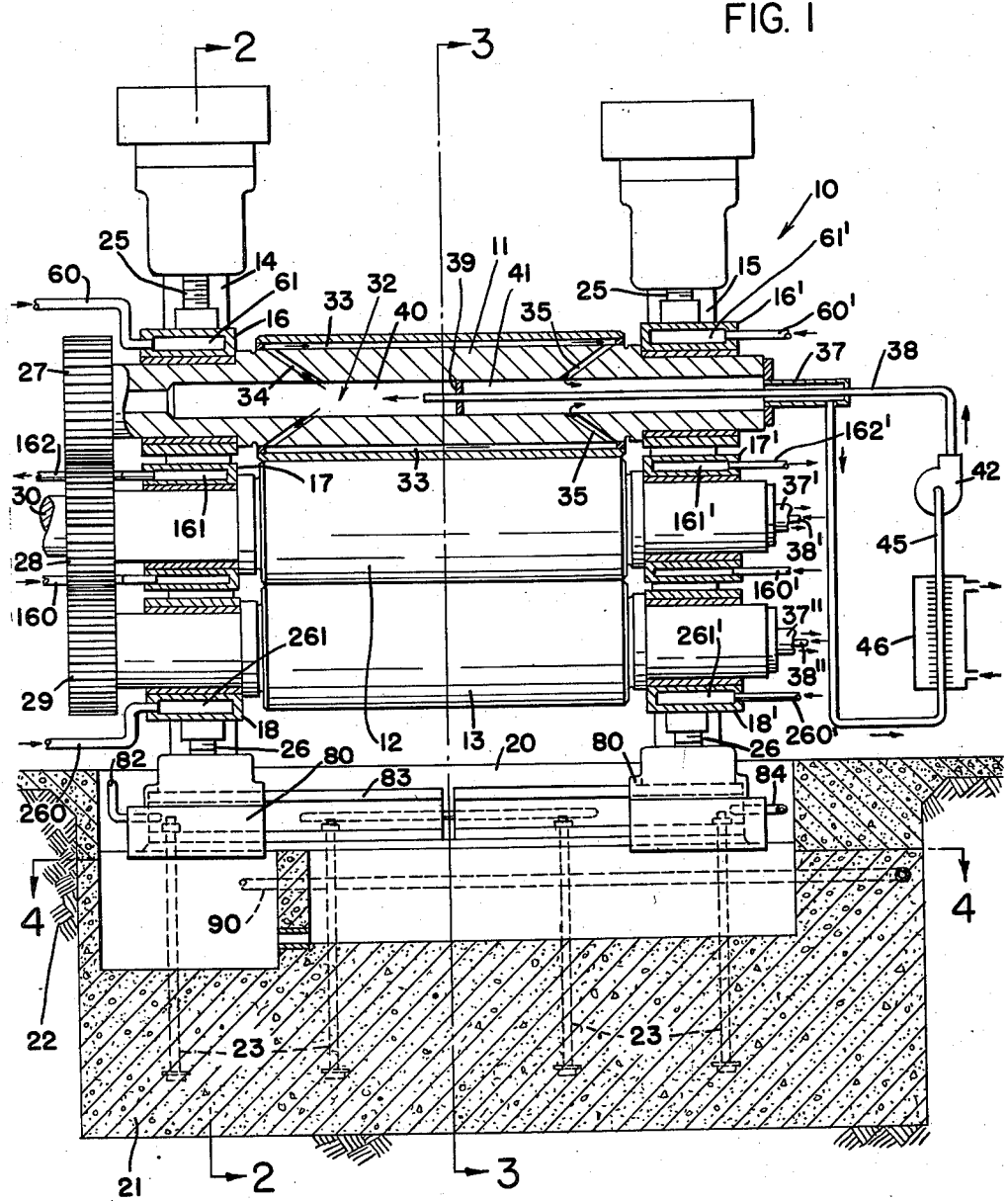

April 26, 1960 E. J. VON DER HEIDE 2,933,760
PROCESS AND APPARATUS FOR OBTAINING RUBBER
OR PLASTIC SHEETING OF UNIFORM THICKNESS
AT HIGH TEMPERATURES
Filed Aug. 22, 1957 4 Sheets-Sheet 1

INVENTOR.
ELMER J. VON DER HEIDE
BY
ATTORNEYS

INVENTOR.
ELMER J. VON DER HEIDE
ATTORNEYS

April 26, 1960 E. J. VON DER HEIDE 2,933,760
PROCESS AND APPARATUS FOR OBTAINING RUBBER
OR PLASTIC SHEETING OF UNIFORM THICKNESS
AT HIGH TEMPERATURES
Filed Aug. 22, 1957 4 Sheets-Sheet 4

INVENTOR.
ELMER J. VON DER HEIDE
BY
ATTORNEYS

United States Patent Office 2,933,760
Patented Apr. 26, 1960

2,933,760
PROCESS AND APPARATUS FOR OBTAINING RUBBER OR PLASTIC SHEETING OF UNIFORM THICKNESS AT HIGH TEMPERATURES

Elmer J. von der Heide, Hudson, Ohio

Application August 22, 1957, Serial No. 679,673

5 Claims. (Cl. 18—2)

This invention relates to a process and apparatus for producing rubber or plastic sheeting of uniform thickness or gauge at high temperatures, and more particularly it relates to temperature control of calenders through which the rubber or plastic material is passed.

One of the problems in calendering rubber or plastic sheeting at relatively high temperatures is to obtain a product of uniform thickness transversely as it passes between the calender rolls. Any difference in roll diameter across the face of a roll, produces variations in the thickness of the rubber or plastic being calendered.

In a conventional calender, for example, one having 32 inch diameter rolls mounted in conventional housings and bearing boxes, a differential temperature, between the center and the ends of the roll, in the neighborhood of 20° F. is not uncommon, where the operating temperature is around 350° F. This reduced temperature near the ends of the roll results in a diameter differential between the center and ends of the roll of approximately .0038 of an inch. For each operating temperature, the differential temperature and diameter differential between the center and ends of a roll are different. In the past, efforts have been made to correct this situation by having the rolls crowned, or concaved, by grinding to suit some compromise set of conditions. However, these efforts have not always been satisfactory, particularly where relatively thin plastic sheeting, say on the order of .003 of an inch, is to be produced.

I have discovered that if the roll operating temperature is maintained constant over the length of each calender roll (although each roll need not necessarily be the same temperature as an adjacent roll) there is no diameter differential across the face of the roll, and consequently rubber or plastic sheeting emerging from the calender will be of uniform thickness throughout. Thus, it is an object of this invention to provide a calender wherein each roll is maintained at a constant operating temperature throughout its entire length, thereby providing a novel process and apparatus to insure uniformity of thickness in rubber or plastic sheeting which is being calendered.

In previous calenders, the heat loss at the ends of the rolls was usually due to conduction of heat from the rolls through the bearing boxes into the calender housings, and from the latter into the ground through the calender foundation. Another object of this invention is to provide means for maintaining the bearing boxes for each roll at the same temperature as the roll operating temperature, so there can be no flow of heat from the rolls to the bearing boxes.

A further object is to provide means for maintaining the calender housings at roll operating temperature so there can be no flow of heat from the bearing boxes into the housings.

Since the amount of heat flowing from the calender housings into the earth depends on the temperature difference between the housings and the earth, a further object is to interpose a suitable heat source between the housings and the earth to prevent excessive heat flow into the earth.

Other objects and advantages will become apparent from the following description taken in conjunction with the accompanying drawings.

In the drawings.

Figure 2:
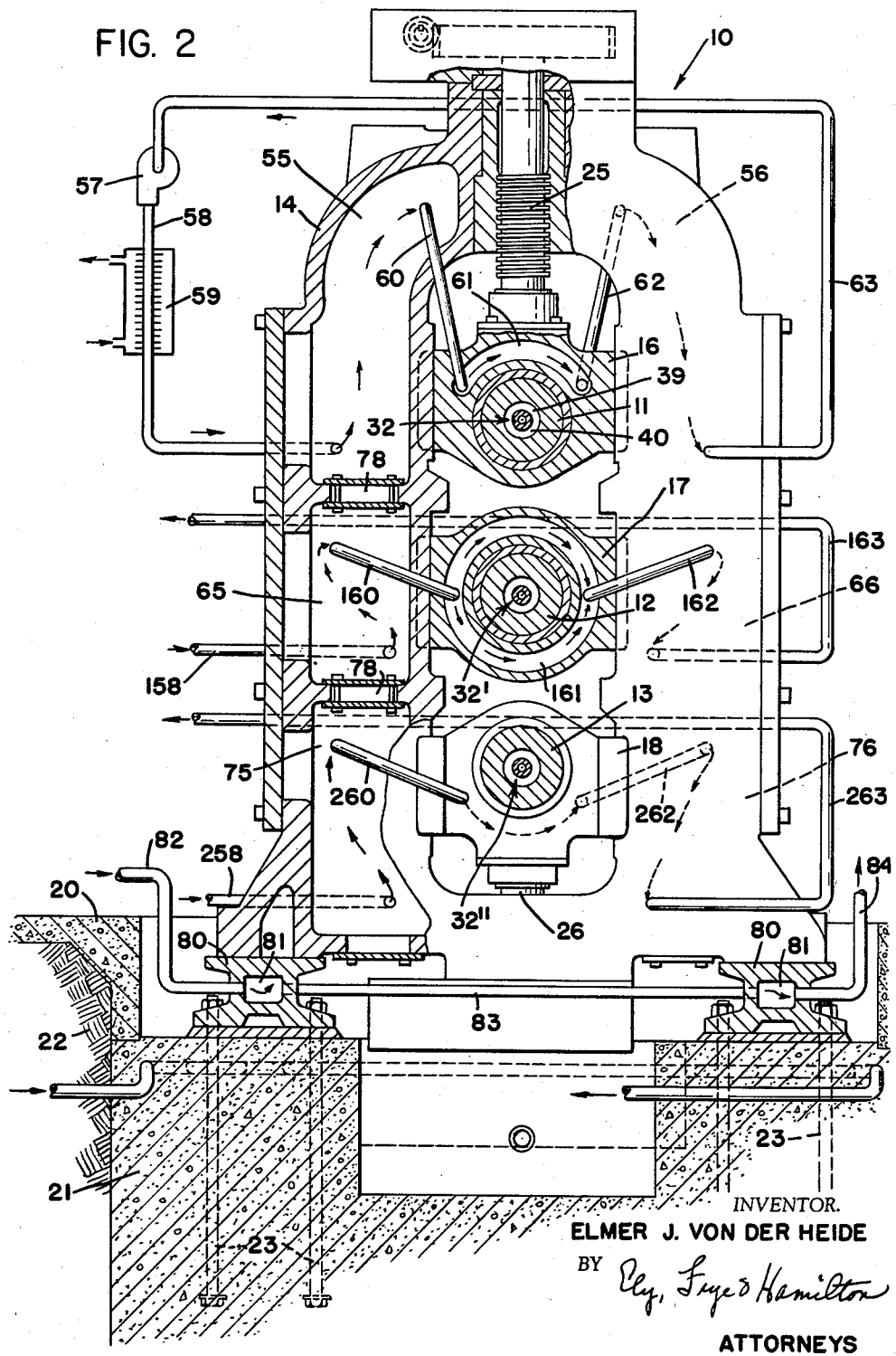
Figure 3:
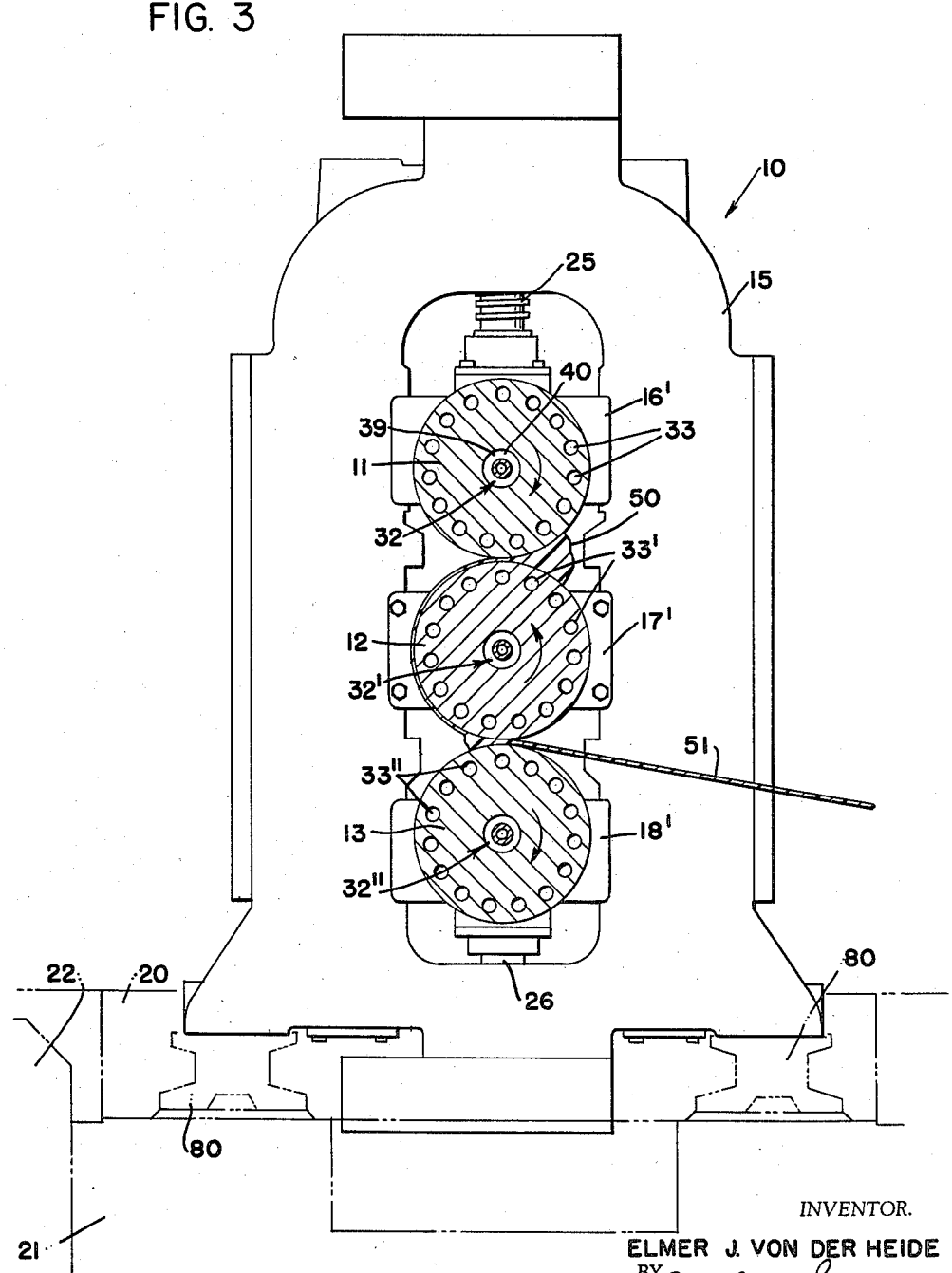
Figure 4:
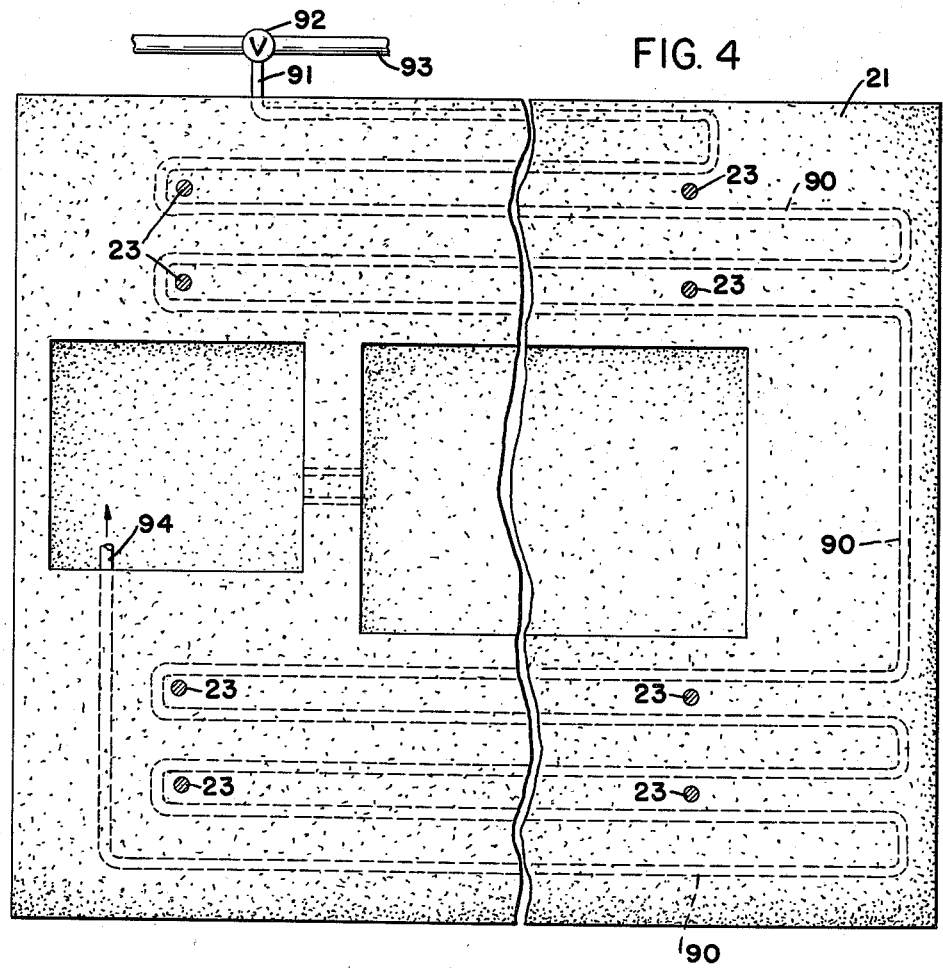
Figure 5:
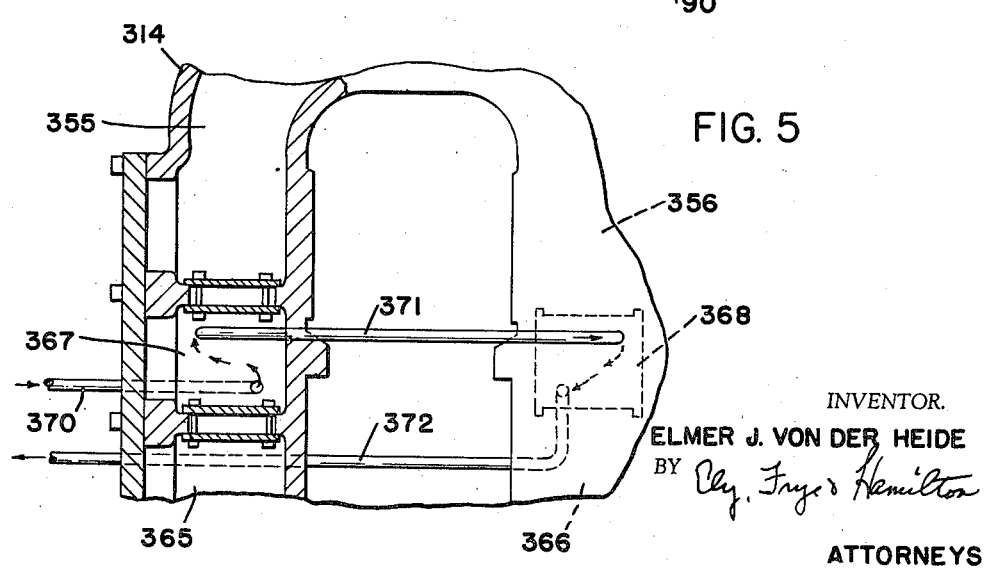

Fig. 1 is a front elevation of the relevant parts of a typical three roll calender embodying my invention, with some parts shown in section and with the side housings being opened up, for the sake of clarity, Fig. 2 is an enlarged vertical section through one side housing of the calender, taken substantially on line 2—2 of Fig. 1, Fig. 3 is an enlarged central vertical section taken substantially on line 3—3 of Fig. 1, Fig. 4 is a horizontal section through the calender foundation, taken substantially on line 4—4 of Fig. 1, and showing one way to heat the foundation, and Fig. 5 is an enlarged fragmentary view of a portion of one side housing showing a modified arrangement with a supplemental heating chamber between the regular housing chambers.

Referring to the drawings, I have illustrated my invention for use with a vertical three roll calender, but it will be understood that the invention may be utilized with any type calender regardless of the number of rolls or their alignment.

The numeral 10 indicates the relevant parts of a typical vertical three roll calender in its entirety, having a top roll 11, a center or drive roll 12, and a bottom roll 13. Each roll is formed of cast iron or other suitable ferrous metal and has reduced end portions which are suitably journaled for rotation in bearing boxes conventionally mounted in cast iron side frame housings 14 and 15. In Fig. 1, these housings are opened up for the sake of clarity, but housing 14 is clearly shown in Fig. 2, while housing 15 may be clearly seen in Fig. 3. As shown, roll 11 is mounted in bearing boxes 16 and 16', roll 12 in boxes 17 and 17', and roll 13 in boxes 18 and 18'.

The housing 14 and 15 are mounted on a suitable base 20, which extends below the upper surface of a concrete foundation 21 that is embedded in the earth 22, and the base and housings are tightly secured to the concrete foundation in the usual manner by means of bolts or tie rods and nuts 23. Conventional upper and lower adjusting mechanisms 25 and 26 respectively, are provided to vertically adjust the rolls in a manner well understood in the art. Conventional upper cross beams (not shown) may also be utilized to brace the housings 14 and 15.

The rolls are adapted to be rotated in the usual manner, at preselected speeds for the material passing therethrough, by means of gears 27, 28 and 29 mounted on the outer ends of rolls 11, 12 and 13, respectively (Fig. 1). Gear 28 is the driving gear, connected by drive shaft 30 to suitable driving mechanism (not shown). As viewed in Fig. 3, gear 28 drives roll 12 counterclockwise, and through gears 27 and 29, drives the other rolls clockwise.

Referring to Fig. 1, I have shown upper roll 11 in section to more clearly show how this roll is heated to and maintained at operating temperature. Since all of the rolls are formed and heated in the same conventional manner, a description of the operation in connection with roll 11 will suffice for all. As indicated, roll 11 has a central core, indicated in its entirety by the numeral 32, and a plurality of spaced longitudinal passages 33 located inwardly of its outer surface. On one side of the vertical center of the roll 11, diagonal passages 34 lead from the core 32 to the ends of passages 33 adjacent housing 14, while on the other side of said center, similar diagonal passages 35, lead in the opposite direction to passages 34, from core 32 to the ends of passages 33 adjacent housing 15.

Mounted at one end of roll 11 in non-rotating relation thereto, is a conventional stuffing box 37, through which extends a section of metal tubing 38 the inner end of which extends into the central area of core 32 and carries a baffle or partition 39 that engages the inner wall of roll 11 without interfering with rotation of the latter, and divides core 32 into a heat medium receiving compartment 40 and a discharging compartment 41. The outer end of tubing 38 is connected to one end of a conventional centrifugal pump 42. One end of another section of tubing 45 is connected to pump 42, while its opposite end is connected near the outer end of stuffing box 37, and this tubing section passes through a conventional heat exchanger 46.

Thus, a closed system is provided for heating roll 11, wherein a heating medium (to be referred to later) is pumped through tubing section 38 into compartment 40 of core 32, from where it passes through passages 34, 33 and 35 into compartment 41 of core 32, and from the latter through stuffing box 37, tubing section 45 and heat exchanger 46 back to pump 42, from which it is recirculated.

In connection with the heating arrangements for roll 12, the same type of closed system is provided so that a repetition thereof is not necessary, and such parts thereof as are shown have numerals similar to those referred to with respect to roll 11 except that such numerals are primed. Likewise, since the same type of system is provided for roll 13, such numerals as are used in connection with the heating of roll 13 are double primed.

In heating calender rolls it is standard practice to progressively increase the temperature from the top to the bottom roll. For example, one arrangement commonly used with rubber is to heat the top roll to about 210° F., the center roll to about 220° F., and the bottom roll to about 230° F. For roll temperatures up to about 400° F., the heating medium can be hot water under pressure. Above 400° F., however, it is necessary to use a high temperature heat transfer medium, such as "Dowtherm," available from Dow Chemical Company, or some similar medium.

It is when roll operating temperatures are about 200° F. and above that temperature variations between the center and the ends of a roll are sufficiently noticeable to affect the thickness of the final product emerging from the calender. When the operating temperature or temperature at the center of the roll is about 350° F., it is not uncommon to find temperatures at the ends of the roll about 20° F. less than the center. Thus, my invention begins to be more particularly useful with roll operating temperatures above 200° F.

For the purpose of better describing my invention, it will be assumed that the material passing through the calender will be resin known as "Boltaron," which is a vinyl plastic compound available from The General Tire & Rubber Company, and that the end product is to be sheeting of about .003 of an inch in thickness. To handle this material properly the top roll should have an operating temperature of about 410° F., the center roll about 425° F., and the bottom roll about 450° F. Of course, other plastic materials, for example "Vinylite," a vinyl plastic compound, obtainable from Union Carbide & Carbon Corp., and "Kralastic," a vinyl plastic compound, obtainable from United States Rubber Company, may be readily calendered with my invention to produce relatively thin sheeting of uniform thickness. In this instance the material to be calendered is usually in the form of chips or pellets, and it is preferably conventionally preheated to a temperature approximating a plastic state, which temperature in this case would be about 400° F., so that the material may be fed as a mass or bank (indicated by the numeral 50, Fig. 3) to the first set of rolls 11 and 12. After passing between the latter rolls, the material adheres to roll 12 and passes between the latter and roll 13, after which it emerges from the calender as a thin sheet 51, the thickness of which is greatly exaggerated in Fig. 3.

In order to insure uniform thickness transversely of the sheeting being calendered, I propose to maintain a uniform temperature throughout the length of each calender roll, so there will be no variation in the diameter of each roll from end to end. Starting with roll 11, the operating temperature of which will be about 410° F., I have shown one arrangement for heating the bearing boxes 16 and 16' to a similar temperature, so that there will be no loss of heat from the roll 11 to the bearing boxes. Other heating arrangements and sources of heat may be utilized if desired, since the important feature in this step of my process is to maintain the bearing boxes at the same temperature as the roll, regardless of the source of heat.

Referring more particularly to Fig. 2, I have shown a closed system for heating the bearing box 16, which also involves furnishing heat to the adjacent upper chambers 55 and 56 of housing 14, in order to maintain the housing at substantially the same temperature as the bearing box, so there will be no loss of heat from the bearing box to the housing. This system, in this instance, requires the use of "Dowtherm" or some other suitable heating medium, which is pumped from a conventional centrifugal pump 57, through a section of metal tubing 58 that passes through a conventional heat exchanger 59 and is connected to the lower portion of chamber 55. From the upper portion of chamber 55 a section of tubing 60 leads to one side of an arcuate passage 61 formed in the upper portion of bearing box 16, and from the opposite side of passage 61, a section of tubing 62 leads to the upper portion of chamber 56. From the lower portion of the latter chamber, a section of tubing 63 leads back to the pump 57.

The system for heating bearing box 16' and the upper chambers of housing 15 is identical with the system just described and need not be repeated. Any elements shown in the drawings corresponding to elements of the latter system have corresponding primed numerals. With the "Boltaron" material being calendered, the temperature of bearing boxes 16 and 16' and their adjacent housing chambers is maintained at about 410° F.

In connection with the system for heating bearing box 17, this system also involves heating central chambers 65 and 66 of housing 14, and is substantially identical with the system for heating box 16. As indicated, a section of tubing 158 leads from a pump (not shown) similar to pump 57, through a heat exchanger (not shown) similar to member 59, into the lower end of chamber 65. From the upper end of chamber 65, a section of tubing 160 leads to one side of an annular passage 161 in bearing box 17, and from the opposite side of passage 161, a section of tubing 162 leads to the upper portion of chamber 66. From the lower portion of chamber 66, a section of tubing 163 leads back to the pump.

Again, the system for heating bearing box 17' and the central chambers of housing 15 is identical with the system for heating box 17, and it is not necessary to repeat same, but any elements in drawings corresponding to elements of the latter system have corresponding primed numerals.

With the material being calendered as an example, the bearing boxes 17 and 17' and their adjacent housing chambers will, in this instance, be maintained at a temperature of about 425° F. during calendering operations.

With respect to the arrangement for heating bearing box 18 and the lower chambers 75 and 76 of housing 14, the system is substantially identical with those previously described for boxes 16 and 17. As shown, a tubing section 258 leads from a pump (not shown) similarly to pump 57, through a heat exchanger (not shown) similar to member 59, into the lower portion of chamber 75.

From the upper portion of the latter chamber, a section of tubing 260 leads to one side of an arcuate passage 261 in box 18, while from the other side of the latter passage, a section of tubing 262 leads to the upper portion of chamber 76. From the lower portion of the latter chamber a section of tubing 263 leads back to the pump.

Once more, the system for heating bearing box 18' and the lower chambers of housing 15 is identical with the system for heating box 18, and need not be repeated. However, any elements in the drawings corresponding to elements of the latter system have corresponding primed numerals.

Since the material being calendered as an example in this instance is "Boltaron," the bearing boxes 18 and 18' and their adjacent housing chambers will be maintained at a temperature of about 450° F. during calendering operations.

Suitable insulating spaces 78 (Fig. 2) are provided between adjacent chambers of housing 14 and 15 to assist in maintaining the required heat variations between the chambers.

The foregoing heating arrangements adequately provide for maintaining the ends of the calender rolls at substantially the same temperature as the temperature at the center of the rolls. However, it is not desirable to allow the heat in the housings 14 and 15 to quickly dissipate into the ground, and to prevent this, heated members 80 are interposed between the calendar housings and the concrete foundation 21. In this instance, these members 80 are cored centrally as at 81 and have a suitable heating medium continually passed therethrough by means of tubing sections 82, 83 and 84, which are connected with a suitable pump (not shown) and heat exchanger (not shown). The temperature of members 80 should be about the same as the temperature at the bottom of the housings 14 and 15, so that for the material being used as an example, members 80 should be maintained at about 450° F.

In order to further prevent quick dissipation of heat into the earth from members 80, the concrete foundation 21 is also heated, but to a lesser degree. In use, the concrete foundation need be heated only to about 350° F. for the material being used as an example, and this heat can be obtained from a regular steam line which would be available in most any plant in which the calendar is located.

As more clearly shown in Fig. 4, a continuous tube 90 runs back and forth transversely through the foundation 21. The inlet end 91 of tube 90 is connected to a valve 92 located in any available steam pipe 93, and the outlet end 94 may lead to any desired place.

In Fig. 5 I have shown a modified form of calender for use when there would be a large temperature differential between two of the regular housing chambers which might impose too severe stresses on the metal forming the housing. Under such conditions I prefer to use a separator chamber between the regular housing chambers which is heated to an intermediate temperature. For example, in Fig. 5 the calendar housing 314 has regular chambers 355, 356, and 365, 366, corresponding to their counterparts in Fig. 2, and in addition has separator chamber 367 between chambers 355 and 365, and separator chamber 368 between chambers 356 and 366.

Thus, if there were to be as much as a 200° F. temperature differential between chambers 355 and 365, and between chambers 356 and 366, the separator chambers 367 and 368 would be heated to an intermediate temperature 100° F. different from each adjacent regular chamber. As indicated in Fig. 5, the separator chambers are heated by a tubing section 370, one end of which leads to a suitable heat exchanger (not shown) and pump (not shown), while the opposite end is connected to the lower portion of chamber 367. From the upper portion of the latter chamber a tubing section 371 leads to the upper portion of chamber 368, while a section of tubing 372 leads from the lower portion of chamber 368 back to the pump.

While I have shown and described the preferred form of my invention, it will be apparent that the invention is not limited thereto, and that changes and modifications may be made therein without departing from the spirit of the invention and from the scope of the subjoined claims.

What is claimed is:

1. In a calender having a plurality of cooperating rolls for forming a sheet therebetween, bearing boxes for the roll necks at the ends of each roll, oppositely disposed housings supporting said bearing boxes, a foundation for said housings, means to heat said rolls to a predetermined operating temperature, and means for applying heat to the bearing boxes externally of the roll to a temperature substantially equal to the operating temperature of each roll respectively.

2. In a calender having a plurality of cooperating rolls for forming a sheet therebetween, bearing boxes for the roll necks at the ends of each roll, passages within said bearing boxes, oppositely disposed housings and supporting said bearing boxes, chambers within said housings, a foundation for said housings, means to heat said rolls to a predetermined operating temperature, and separate means to circulate a heating medium through the passages in said bearing boxes and the chambers within said housings to heat said bearing boxes and housings to a temperature equal to the operating temperature of each roll respectively.

3. In a calender having a plurality of cooperating rolls for forming a sheet therebetween, bearing boxes for the roll necks at the ends of each roll, oppositely disposed housings supporting said bearing boxes, a foundation for said housings, means to heat said rolls to a predetermined operating temperature, means other than said roll heating means to heat said bearing boxes and said housings to a temperature equal to the operating temperature of each roll respectively, and further means to heat said foundation to a temperature less than the temperature of the rolls, bearing boxes and housings.

4. The process of forming sheet material of uniform thickness which comprises rolling the material between at least a pair of mounted rolls, heating said rolls to selected operating temperatures to be determined by the type of material being rolled, and preventing loss of heat from the ends of said rolls by independently heating the mounts carrying said rolls to maintain them at temperatures substantially equal to the operating temperatures of said rolls.

5. The process of forming sheet material of uniform thickness which comprises rolling the material between a plurality of rolls mounted in housed end bearings, heating each of said rolls to a selected operating temperature to be determined by the type of material being rolled, and preventing loss of heat from the ends of said rolls by independently circulating a heating medium through the housed bearings for each roll to maintain each set of housed bearings at a temperature substantially equal to the operating temperature of its respective roll.

References Cited in the file of this patent

UNITED STATES PATENTS

| 1,167,036 | Witham et al. | Jan. 4, 1916 |
| 2,108,071 | Low | Feb. 15, 1938 |

OTHER REFERENCES

"Modifying Temperature Distribution over Calender Rolls by Electro-Magnetic Induction" (Ardichvili); published by British Plastics, November 1953, pages 400, 401.

"Improved Temperature Uniformity of Calender Roll Surfaces Obtained by Electromagnetic Induction" (Ardichvili), published by India Rubber World, February 1954, pages 621, 622.